United States Patent
Cohen

(10) Patent No.: US 11,537,994 B2
(45) Date of Patent: Dec. 27, 2022

(54) MITIGATING DISRUPTIVE EFFECTS OF DETECTED DIMINISHED WORKING CAPACITY

(71) Applicant: INTERNATIONAL BUSINESS MACHINES CORPORATION, Armonk, NY (US)

(72) Inventor: Aaron Michael Cohen, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 16/204,279

(22) Filed: Nov. 29, 2018

(65) Prior Publication Data

US 2020/0175477 A1   Jun. 4, 2020

(51) Int. Cl.
*G06Q 10/10* (2012.01)
*G06N 20/00* (2019.01)

(52) U.S. Cl.
CPC ......... *G06Q 10/1091* (2013.01); *G06N 20/00* (2019.01)

(58) Field of Classification Search
CPC ........ G06Q 40/08; G06Q 40/00; G06Q 50/22; G06Q 10/087; G06Q 10/10; G06Q 50/00; G06Q 10/04; G06Q 10/06; G06Q 10/107; G06Q 10/1091; G06Q 30/0185; G16H 70/20; G16H 50/30; G16H 20/30; G16H 40/63; G16H 20/13; G16H 20/10; G16H 40/67; G16H 40/20; G16H 50/20; G16H 10/60

See application file for complete search history.

(56) References Cited

U.S. PATENT DOCUMENTS

| 8,566,121 | B2 * | 10/2013 | Ramasubramanian ...................... G06F 19/3456 705/3 |
| 8,781,873 | B2 * | 7/2014 | Purohit ............ G06Q 10/06375 705/7.18 |
| 9,286,637 | B1 * | 3/2016 | Keld ....................... G06Q 40/02 |
| 9,468,631 | B1 * | 10/2016 | Knobler ............. A61K 31/4045 |
| 2003/0120516 | A1 | 6/2003 | Perednia |

(Continued)

OTHER PUBLICATIONS

US DOT (Apr. 2011). Prescription and Over-the-Counter Medications Tool Kit, Federal Transit Administration (Year: 2011).*

(Continued)

*Primary Examiner* — Peter Ludwig
(74) *Attorney, Agent, or Firm* — Scott Dobson; Andrew D. Wright; Calderon Safran & Cole, P.C.

(57) ABSTRACT

A computer-implemented method comprising: receiving, by a computing device, prescription information for an individual identifying a medication and a condition; identifying, by the computing device, job roles impacted by the condition; identifying, by the computing device, job roles impacted by side effects of the medication; determining, by the computing device, that a working capacity of the individual is diminished by the condition or the side effects of the medication based on job roles of the individual; generating, by the computing device, mitigation instructions in response to the determining; and executing, by the computing device, the mitigation instructions.

20 Claims, 8 Drawing Sheets

(56) References Cited

U.S. PATENT DOCUMENTS

| | | | |
|---|---|---|---|
| 2007/0233875 A1 | 10/2007 | Raghav et al. | |
| 2008/0091504 A1 | 4/2008 | Lyle et al. | |
| 2008/0201174 A1* | 8/2008 | Ramasubramanian | G06F 19/3456 705/3 |
| 2009/0204429 A1* | 8/2009 | Barker | G06Q 40/08 705/2 |
| 2011/0015947 A1* | 1/2011 | Erry | G06F 19/3456 705/3 |
| 2012/0296859 A1* | 11/2012 | Haynes | G06Q 10/109 707/769 |
| 2015/0188852 A1* | 7/2015 | Seth | H04L 51/02 709/206 |
| 2016/0057082 A1* | 2/2016 | Bhide | H04L 51/224 709/206 |
| 2016/0217429 A1 | 7/2016 | Lau | |
| 2017/0124528 A1 | 5/2017 | Chakra et al. | |
| 2018/0107793 A1* | 4/2018 | Ni | G16H 10/60 |
| 2018/0197151 A1* | 7/2018 | Krishnaswamy | G06Q 10/107 |
| 2018/0330302 A1* | 11/2018 | Peterson | G10L 25/66 |
| 2019/0114939 A1* | 4/2019 | Kielbasa | G09B 19/00 |
| 2019/0251456 A1* | 8/2019 | Constantin | G16H 50/20 |

OTHER PUBLICATIONS

ME/CFS: A Primer for Clinical Practitioners, published by the International Association for Chronic Fatigue Syndrome, 2014, available at https://www.massmecfs.org/images/pdf/pediatric/Functional_Capacity_Scale_and_Activity_Log.pdf. ("FCS").*

Mell et al., "The NIST Definition of Cloud Computing", NIST, Special Publication 800-145, Sep. 2011, 7 pages.

* cited by examiner

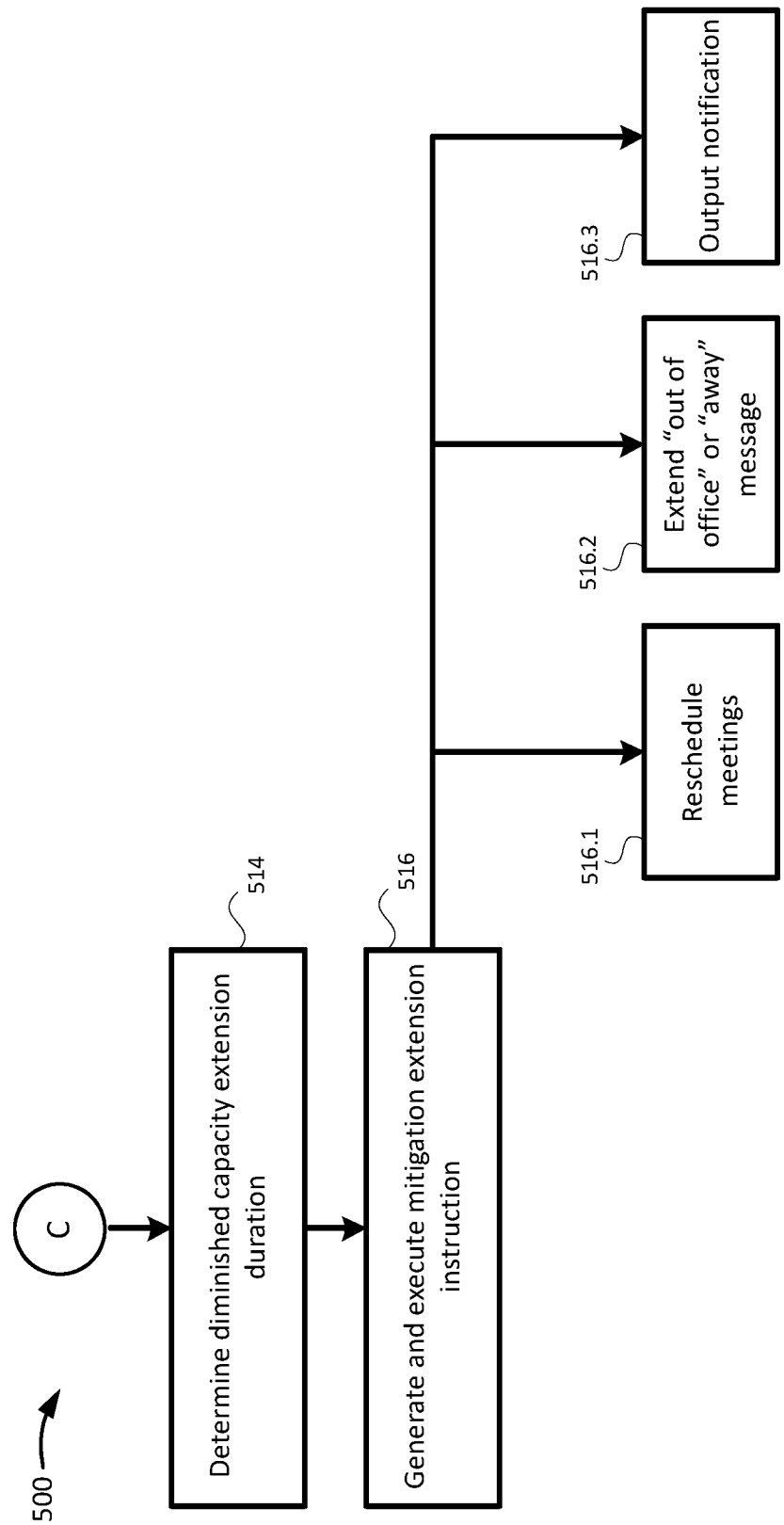

MITIGATING DISRUPTIVE EFFECTS OF DETECTED DIMINISHED WORKING CAPACITY

BACKGROUND

The present invention generally relates to determining mitigating disruption in a work environment and, more particularly, to mitigating disruptive effects of detected diminished working capacity.

A prescription for medication identifies the patient, the medication, dosage instructions, and the duration the medication is to be taken. Pharmacies store prescription information for a patient as an electronic record and for expediting the fulfillment of the prescription. A pharmacy can receive a prescription via fax, a hardcopy slip, and/or in the form of an electronic message (e.g., an E-prescription).

SUMMARY

In an aspect of the invention, a computer-implemented method includes: receiving, by a computing device, prescription information for an individual identifying a medication and a condition; identifying, by the computing device, job roles impacted by the condition; identifying, by the computing device, job roles impacted by side effects of the medication; determining, by the computing device, that a working capacity of the individual is diminished by the condition or the side effects of the medication based on job roles of the individual; generating, by the computing device, mitigation instructions in response to the determining; and executing, by the computing device, the mitigation instructions.

In an aspect of the invention, there is a computer program product including a computer readable storage medium having program instructions embodied therewith. The program instructions are executable by a computing device to cause the computing device to: detect a medical event associated with an individual; determine the medical event diminishes a working capacity of the individual; generate mitigation instructions based on the determining; and execute the mitigation instructions.

In an aspect of the invention, a system includes: a processor, a computer readable memory and a computer readable storage medium associated with a computing device; program instructions to receive prescription information for an individual; program instructions to apply machine learning to determine a medical condition and side effects from the prescription information; program instructions to determine that a working capacity of the individual is diminished based the medical condition or the side effects; program instructions to determine a duration in which the working capacity of the individual is expected to be diminished; program instructions to generate mitigation instructions based on the duration; and program instructions to execute the mitigation instructions. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIGS. 5A-5D show example flowcharts of a process for determining an individual's working capacity based on prescription information, and generating and executing instructions to mitigate the adverse effects of the worker's diminished working capacity or absence.

DETAILED DESCRIPTION

Figure 1:
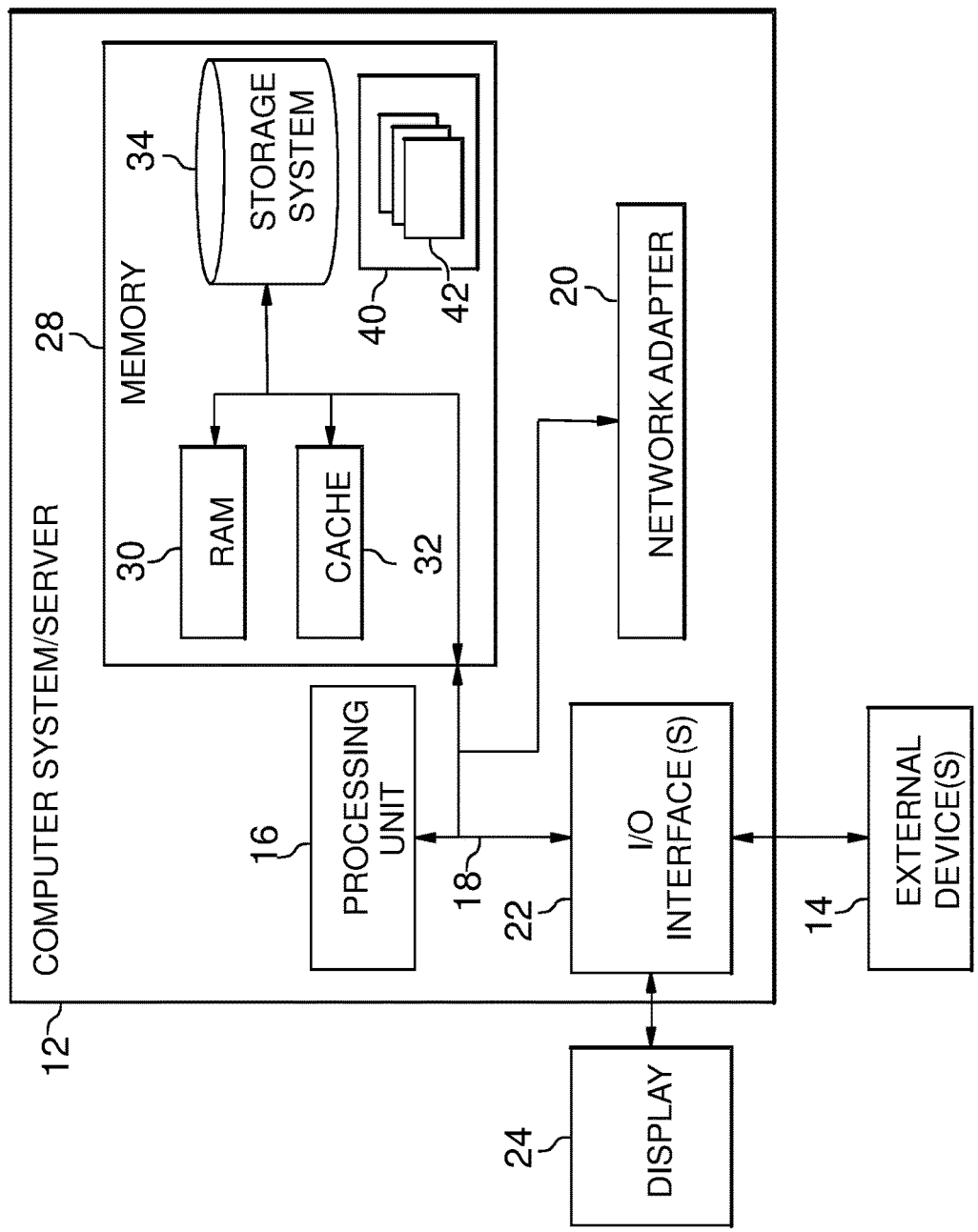
FIG. 1 depicts a cloud computing node according to an embodiment of the present invention.

The present invention generally relates to determining mitigating disruption in a work environment and, more particularly, to mitigating disruptive effects of detected diminished working capacity of individuals. Medical events (e.g., an illness, medical procedures, medical conditions, emergency care, etc.) can reduce the working capacity (workload capacity) of an individual and cause disruption in the operation of a business. In accordance with aspects of the present invention, when an individual (e.g., business partner, business owner, etc.) is subject to such a medical event, a series of actions are taken to minimize or mitigate the disruptive effects on the business. Aspects of the invention are thus directed to helping an individual manage their work when they are affected by a medical event.

As described herein, aspects of the present invention monitor prescription information (and other medical event related information) of an individual (e.g., from cloud-based medical sources), and determine, based on the prescription information, whether the individual's working capacity is diminished and/or whether the individual is expected to be absent from work-related duties. In turn, aspects of the present invention perform a corresponding action to mitigate the disruptive effects of the individual's diminished working capacity or absence. For example, aspects of the present invention generate and output instructions to reschedule/cancel meetings, change the location of meetings from a physical location to a virtual meeting, notify other individuals (e.g., supervisors, customers, team members, etc.) regarding a status/absence of the individual, update status identifiers in multiple communication systems (e.g., "out of office" or "away" messages in e-mail systems, social media systems, instant messaging systems, etc.), re-balance workloads across team members, locations, etc. In this manner, embodiments of the invention advantageously assist an individual in managing their work when they are impacted by a medical event.

As described herein, aspects of the present invention monitor an individual's prescription information. In aspects, a system receives "push" notifications when a pharmacy inputs a prescription and/or a medical insurance system receives a claim for a prescription. Aspects of the present invention implement a look-up table that identifies known conditions and side effects associated with the prescription, and job roles impacted by those conditions and side effects. Aspects of the present invention determine whether the individual's working capacity is impacted based on the information from the look-up table, and the extent to which the individual's working capacity is impacted (e.g., the extent to which the individual's working capacity is diminished). Based on the extent to which the individual's working capacity is diminished (e.g., which, in an example embodiment, is represented as a numeric score), aspects of the present invention generate and output mitigation instructions to mitigate the disruptive effects of the individual's diminished working capacity, and are thus useful by an individual to manage their work in such situations.

In embodiments, the mitigation instructions are executed immediately, on a delay on a start date/time, or in accordance with a schedule (e.g., corresponding to a time in which the individual's capacity is expected to be diminished as determined by the prescription information, such was a start date for medication administration). In embodiments, aspects of the present invention determine a duration of the diminished capacity, and extend the mitigation instructions accordingly (e.g., extend "away" messages, send updated notifications to team members/supervisors, customers, etc.). In embodiments, natural language processing (NLP) and/or machine learning is used to infer medical condition information from prescription information. In embodiments, the triggering and execution of mitigation instructions is based not only on prescription information, but additionally, or alternatively, based on other medical events (e.g., when the individual undergoes medical procedure, visits an emergency facility, and/or when a medical device associated with the individual detects an anomaly).

To the extent the aforementioned implementations collect, store, or employ personal information provided by individuals and pharmacies (e.g., medical information, prescription information, etc.), it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Aspects of the present invention provide a particular solution to the problem of mitigating diminished worker capacity through the use of rules and criteria. For example, aspects of the present invention mitigate diminished worker capacity by generating mitigating instruction, as described herein, in which the instructions are generated based on rules, criteria, and/or scores relating to the extent of the diminished capacity, the type of condition or side-effect experienced by an individual, the individual's job roles, etc. Aspects of the present invention implement machine learning to generate new data relating to the extent of a diminished working capacity, and then use that data to provide the particular solution of mitigating the diminished working capacity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
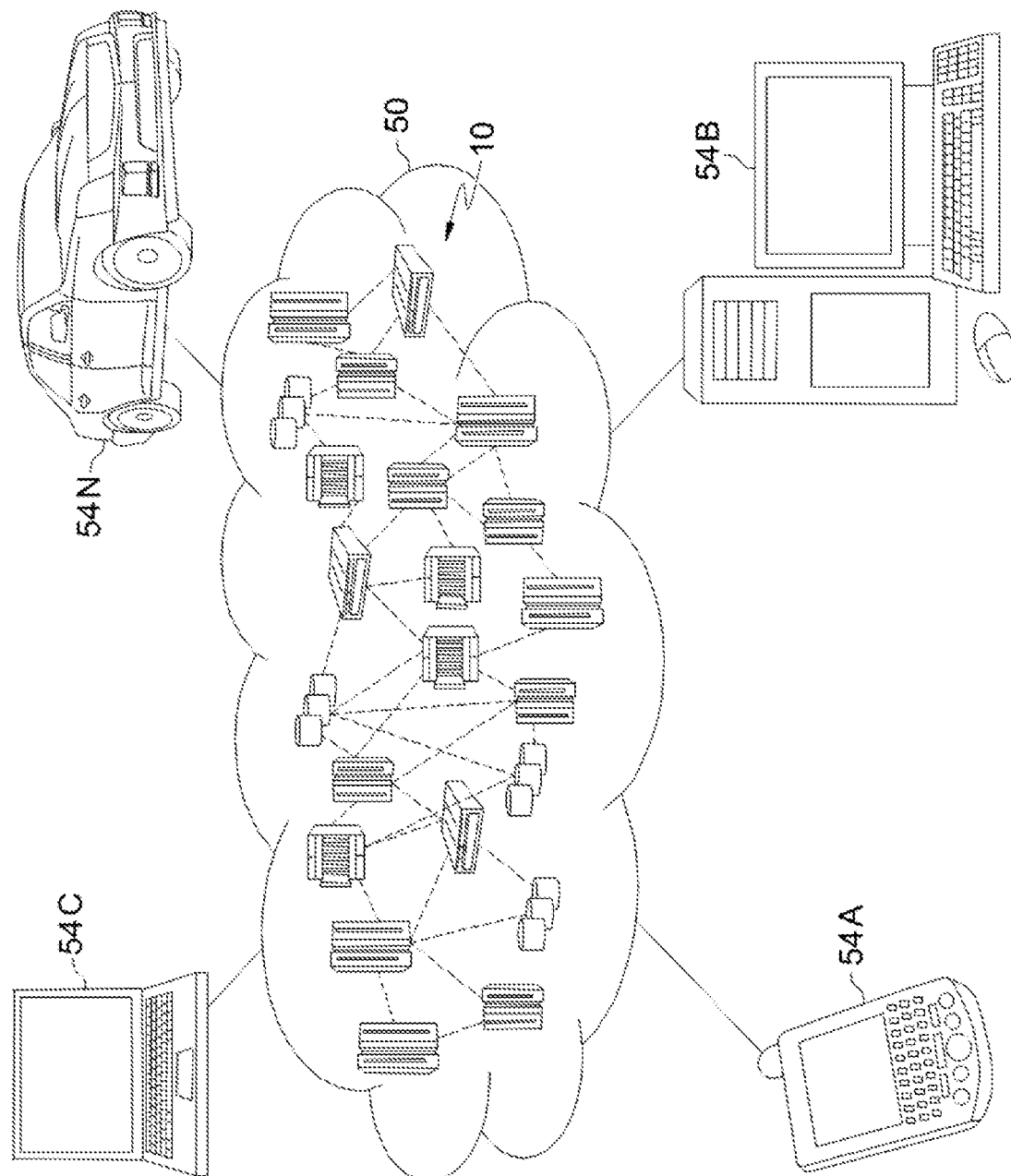
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
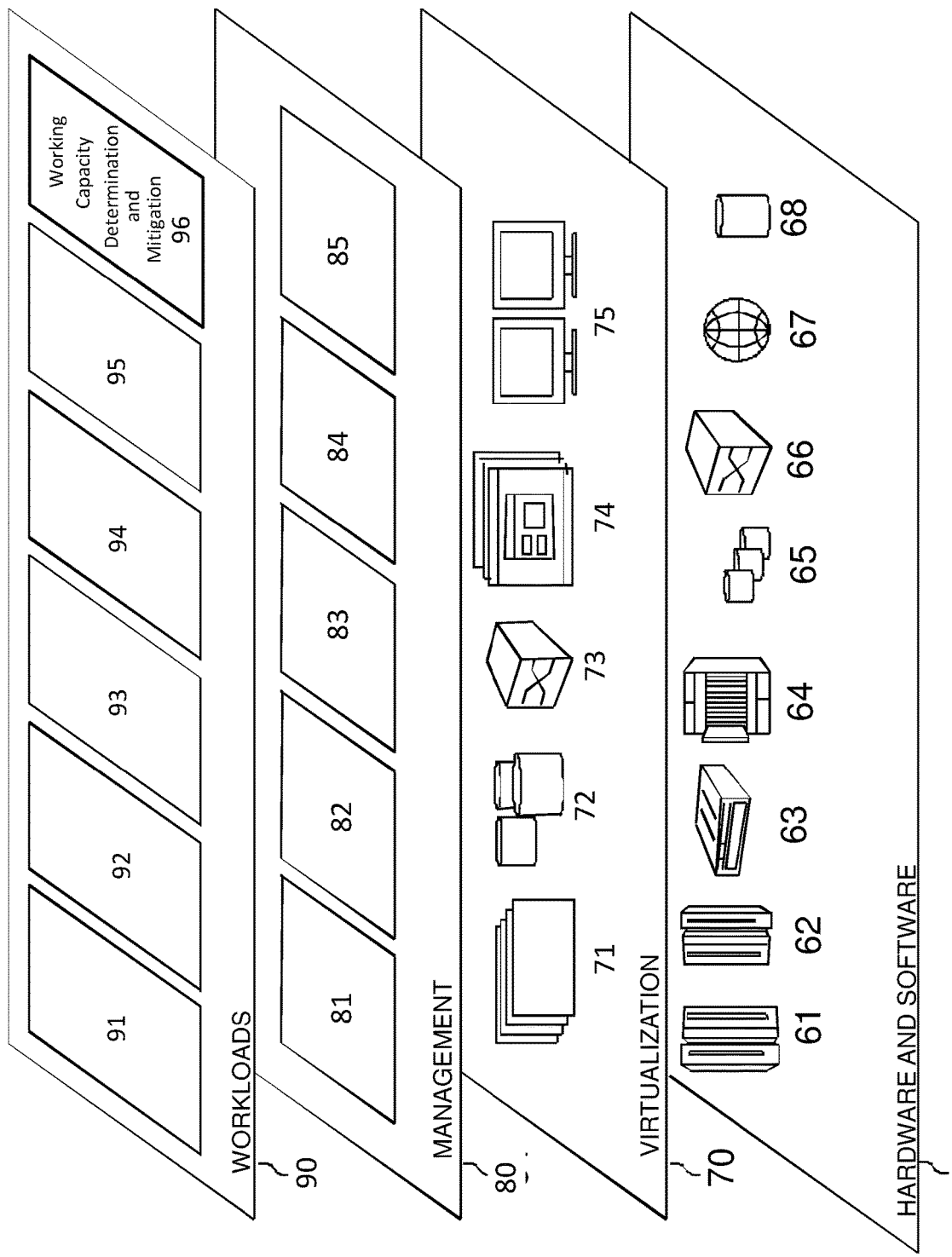
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and working capacity determination and mitigation 96.

Referring back to FIG. 1, the program/utility 40 may include one or more program modules 42 that generally carry out the functions and/or methodologies of embodiments of the invention as described herein (e.g., such as the functionality provided by working capacity determination and mitigation 96). Specifically, the program modules 42 may receive prescription and medical-related information for an individual, determine side effects and/or conditions associated with the prescription and medical-related information, determine whether the side effects and/or conditions impact the individuals' job roles, determine the extent to which the individual's work is affected, and generate and output mitigation instructions based on the extent to which the individual's work is affected. In this manner, embodiments of the invention provide a method for a user to manager their work when they are affected by a medical event. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a working capacity determination and mitigation device as shown in FIG. 4.

Figure 4:
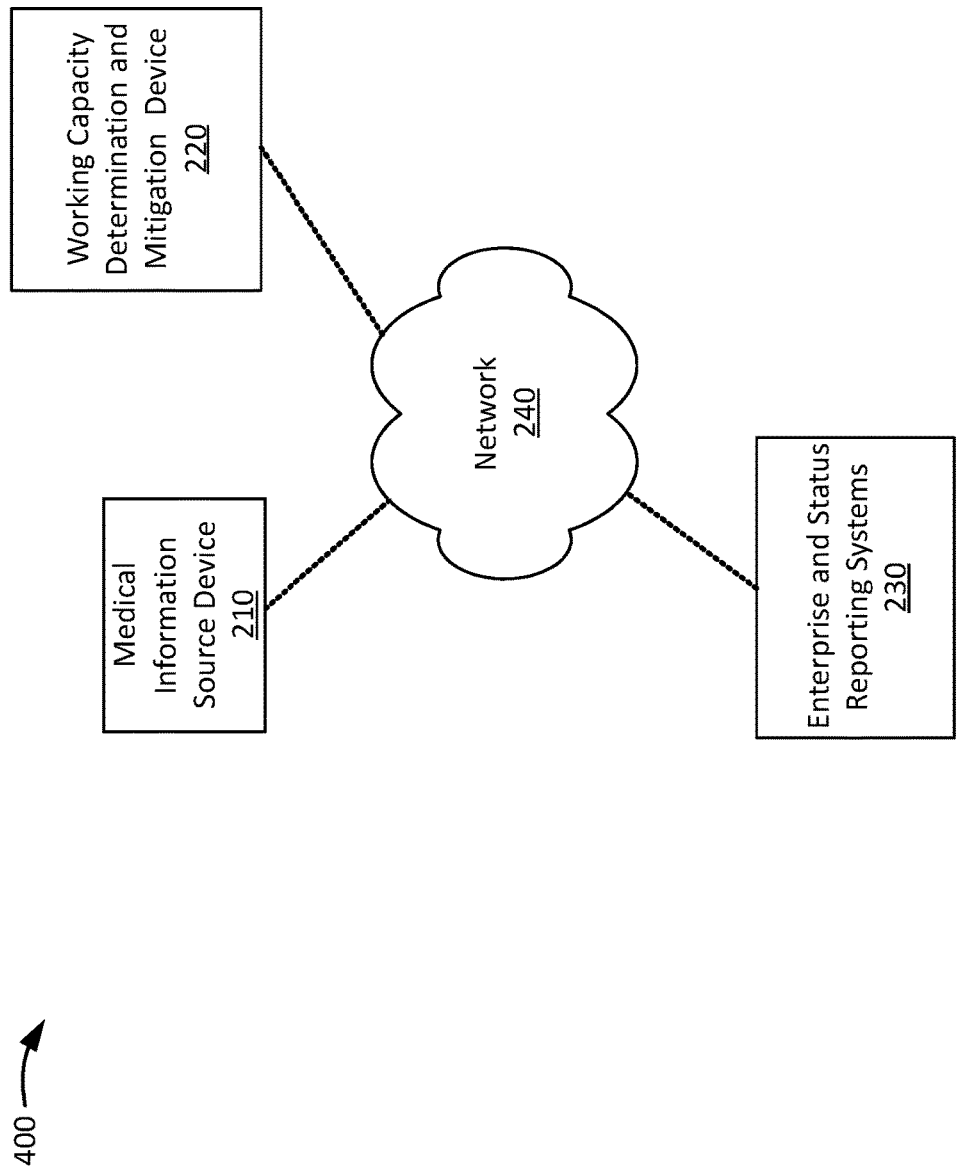
FIG. 4 shows an example environment in accordance with aspects of the present invention.

FIG. 4 shows an example environment in accordance with aspects of the present invention. As shown in FIG. 4, environment 400 includes a medical information source device 210, a working capacity determination and mitigation device 220, an enterprise and status reporting system 230, and a network 240. In embodiments, one or more components in the environment 400 may correspond to one or more components in the cloud computing environment of FIG. 2. In embodiments, one or more components in the environment 400 may include the components of the computer system/server 12 of FIG. 1.

The medical information source device 210 includes one or more computing devices (e.g., such as computer system/server 12 of FIG. 1) that store prescription information and/or other information associated with an individual. For example, in embodiments, the medical information source device 210 is associated and/or managed by a pharmacy, a medical provider, a medical insurance company, or the like. In embodiments, the working capacity determination and mitigation device 220 receives information stored by the medical information source device 210 to determine an individual's working capacity.

The working capacity determination and mitigation device 220 includes one or more computing devices (e.g., such as computer system/server 12 of FIG. 1) that determine the working capacity of an individual based on prescription and/or other medical-related information. Further, the working capacity determination and mitigation device 220 generates and executes mitigation instructions to mitigate the adverse effects of the individual's diminished capacity. As described herein, the working capacity determination and mitigation device 220 receives prescription and medical-related information for an individual (e.g., from the medical information source device 210), determines side effects and/or conditions associated with the prescription and medical-related information, determines whether the side effects and/or conditions impact the individuals' job roles, determines the extent to which the individual's work is affected, and generates and outputs mitigation instructions based on the extent to which the individual's work is affected. In embodiments, the working capacity determination and mitigation device 220 implements machine learning to generate, update, and maintain a look-up table which is used to determine whether the conditions/side effects impact the individual's working capacity, and to what extent.

The enterprise and status reporting system 230 includes one or more computing devices (e.g., such as computer system/server 12 of FIG. 1) that host one or more enterprise or social media applications/services by which a status of an individual can be reported (e.g., based on the individual's working capacity). For example, the enterprise and status reporting system 230 hosts an e-mail service, instant messaging service, social media service, or the like.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

FIGS. 5A-5D show example flowcharts of a process for determining an individual's working capacity based on prescription information, generating, and executing instructions to mitigate the adverse effects of the worker's diminished working capacity or absence. The steps of FIGS. 5A-5D may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

Figure 5A:
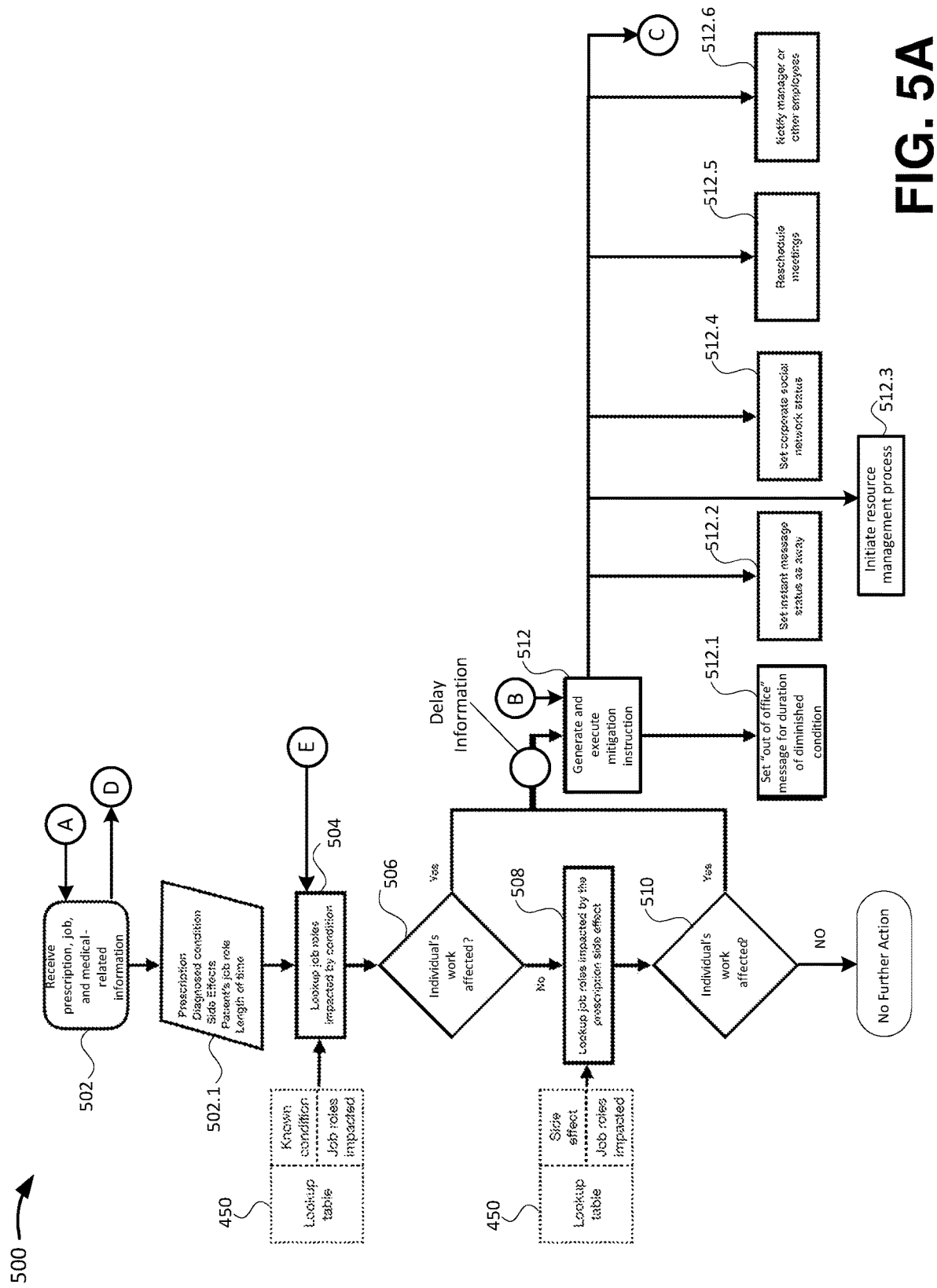
Figure 5C:
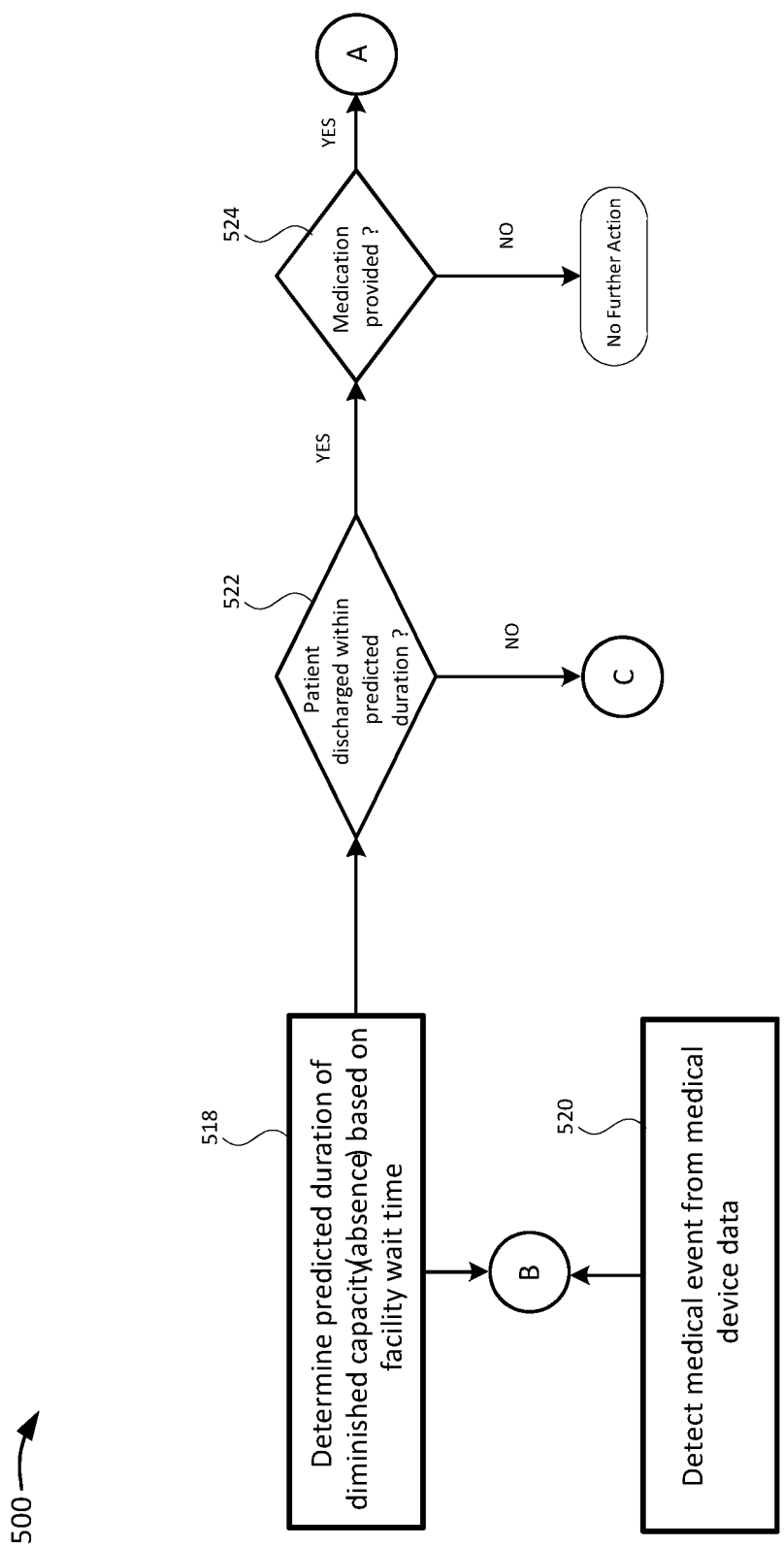
Figure 5D:
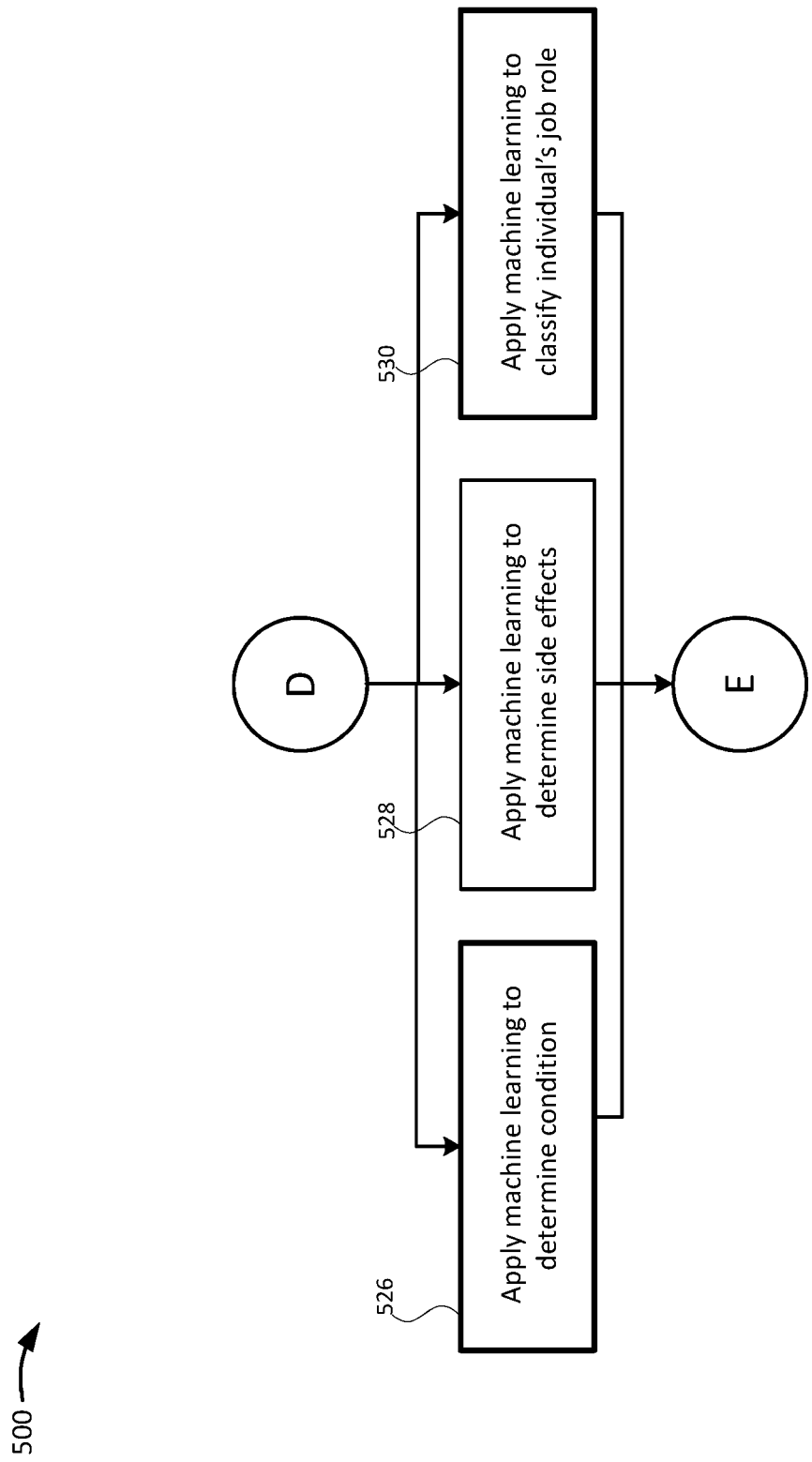

As shown in FIG. 5A, a process 500 includes receiving prescription, job, and medical-related information (step 502). For example, the working capacity determination and mitigation device 220 receives prescription, job, and medical-related information associated with an individual (e.g., from the medical information source device 210 and/or the enterprise and status reporting system 230). In embodiments, the information received includes a data object (e.g., data object 502.1) having prescription information, information regarding a diagnosed condition, information regarding side effects of prescribed medication, the individual or patient's job roles, and length of time at that job.

In embodiments, the working capacity determination and mitigation device 220 infers medical information (e.g., by machine learning, contextual analysis, or the like) and stores the inferred medical information in the data object 502.1. For example, in embodiments, the working capacity determination and mitigation device 220 infers the diagnosed condition and/or side effects based on the type of medication prescribed and/or dosage instructions. As an example, a dosage instruction to refrain from driving with the mediation indicates that a side effect is drowsiness. Using machine learning to infer the information in the data object 502.1 is described in detail with respect to FIG. 5C.

The process 500 also includes looking up job roles impacted by the condition (step 504). For example, the working capacity determination and mitigation device 220 accesses a lookup table (e.g., lookup table 450) that identifies job roles impacted by a condition (e.g., the diagnosed condition identified in the data object 502.1). As described herein, the information in the lookup table 450 is either initially preconfigured or generated over a period of time via machine learning that tracks how different conditions, side effects, and/or medications affect the working capacity of different job roles. Further, the information in the lookup table 450 is maintained and updated using machine learning by tracking how different conditions, side effects, and/or medications affect the working capacity of different job roles.

The process 500 further includes determining whether the individual's work is affected (step 506). For example, the working capacity determination and mitigation device 220 determines whether the individual's work is affected based on the information from the lookup table 450. More specifically, the working capacity determination and mitigation device 220 looks up the job role and the condition (e.g., from the data object 502.1) in the look up table 450 to determine whether the condition is listed under the job role as an affecting condition for the individual's job role.

If, for example, the individual's work is not affected (step 506—NO), the process 500 includes looking up job roles impacted by the prescription side effect (step 508). For example, the working capacity determination and mitigation device 220 looks up job roles impacted by the prescription side effect (e.g., by looking up the job role and the side effect from the data object 502.1) in the lookup table 450.

The process 500 also includes determining whether the individual's work is affected (step 510). For example, the working capacity determination and mitigation device 220 determines whether the individual's work is affected based on the prescription side effects. More specifically, the working capacity determination and mitigation device 220 looks up the job role and the side effects (e.g., from the data object 502.1) in the look up table 450 to determine whether the side effects are listed under the job role as affecting side effects for the individual's job role.

If, for example, the individual's work is not affected (step 510—NO), no further action is taken and the process 500 ends. If, on the other hand, the individual's work is affected, either by the condition or the side effect (step 506—YES, or step 510—YES), the process 500 includes generating and executing a mitigation instruction (step 512). In embodiments, the working capacity determination and mitigation device 220 determines the extent to which the individual's work is affected in order to determine which mitigating instruction(s) to generate and execute. In embodiments, the extent to which the individual's work is affected is represented as a numerical value (e.g., on a scale of 0-100 in which 100 represents that the individual is absent due). In embodiments, the numerical value is stored in the lookup table 450 and is updated and maintained via machine learning over a period of time. In embodiments, the mitigation instruction includes a predicted duration for how long the mitigation instruction should last. In embodiments, the predicted duration is stored in the lookup table 450 in which the predicted duration is determined by machine learning and updated over time using machine learning techniques. In embodiments, the duration identifies a time when the individual's working capacity is expected to be restored, unless the mitigation instruction is extended, as is described in detail herein with respect to FIGS. 5B and 5C.

In embodiments, the working capacity determination and mitigation device 220 generates any number of mitigation instructions, such as:

- an instruction to set an "out of office" message for the predicted duration of the diminished condition, such as in a calendar or e-mail application (instruction 512.1);
- an instruction to set an instant message status as "away" until the end of the predicted duration (instruction 512.2);
- an instruction to initiate a resource management process to re-balance work across other team members, job sites, locations, etc. (instruction 512.3);
- an instruction to set a corporate social network status (instruction 512.4);
- an instruction to reschedule meetings until after the duration (instruction 512.5);
- an instruction to notify managers regarding the diminished condition/absence and the predicted duration (instruction 512.6); or
- another type of mitigation instruction.

In embodiments, working capacity determination and mitigation device 220 generates and executes one or more mitigation instructions (or other mitigation instructions) based on criteria indicating the severity and/or level of the individual's diminished working capacity. For example, if the individual's working capacity (e.g., as represented by a numeric value) is diminished to the point where the individual is entirely absent, one set of mitigation instructions is generated. If the individual's working capacity is only slightly diminished, a different set of mitigation instructions is generated. Further, a predicted duration of the instructions is determined based on the extent of the individual's diminished working capacity, and the mitigation instructions are generated further based on the predicted duration.

In embodiments, the mitigation instruction is executed immediately or after a delay (e.g., based on delay information). In embodiments, the delay corresponds to a time in which the individual is scheduled to take medication (e.g., based on a text analysis of the dosage instructions from the prescription), obtain a medical procedure, or the like. In addition, as described herein in an example embodiment, the mitigation instruction is executed at a time corresponding to a schedule, and the away/status messages generated by executing the mitigation instruction are based on the schedule and/or predicted duration of absence/diminished working capacity.

Referring to FIG. 5B, the process 500 continues to step 514 (via node B) in which a diminished capacity extension duration is determined (step 514). For example, the working capacity determination and mitigation device 220 determines an extension duration for which to extend the mitigation instruction beyond the predicted duration identified in the lookup table 450. More specifically, the working capacity determination and mitigation device 220 determines that the individual's working capacity is expected to remain diminished for a period longer than the initially predicted duration. In embodiments, the working capacity determination and mitigation device 220 determines an extension duration based on when medication is administered, as opposed to when the medication is prescribed (e.g., based on the dosage instructions from the prescription). Additionally, or alternatively, the extension duration is based on wait times at a medical facility, as described in detail herein. Additionally, or alternatively, the extension duration is based on other data indicating that the individual's working capacity is to remain diminished.

The process 500 further includes generating and executing a mitigation extension instruction (step 516). For example, the working capacity determination and mitigation device 220 generates a mitigation extension instruction that extends the duration of the original mitigation instruction (e.g., generated and executed at step 512). In embodiments, the mitigation extension instruction includes:

- an instruction to reschedule meetings (instruction 516.1);
- an instruction to extend an "out of office" or "away" message (instruction 516.2);
- an instruction to output a notification, such as to team members, customers, supervisors, etc. (instruction 516.3);
- other type of instruction.

In embodiments, the process 500 is implemented to generate and execute mitigation instructions based on other types of medical events and information, in addition to or instead of prescription in formation. For example, referring to FIG. 5C, the process 500 includes determining a predicted duration of diminished capacity (e.g., an absence) based on the wait time of a facility (step 518). For example, the working capacity determination and mitigation device 220 determines a predicted duration that an individual is expected to be unavailable or absent based on monitoring the individual's medical activity. More specifically, and as an illustrative environment, when the individual checks into a facility (e.g., an emergency facility), the working capacity determination and mitigation device 220 detects this activity based on communications with one or more patient tracking systems associated with the medical facility, medical provider, and/or medical insurance company (e.g., in an embodiment in which the medical insurance company receives information regarding a registration of the individual to the medical facility). In embodiments, the working capacity determination and mitigation device 220 determines an estimated wait time by communicating with the patient tracking system of the medical facility/medical provider. Based on determining the wait time, the process 500 returns to step 512 (via node B) in which the mitigation instruction is executed and generated. The mitigation instruction, in this example, identifies a duration of absence corresponding to the estimated wait time.

The process 500 further includes detecting a medical event from medical device data (step 520). For example, the working capacity determination and mitigation device 220 detects a medical condition from data provided by a medical device (e.g., biometrics data from a smartwatch, an insulin pump, or the like). As an example, the working capacity determination and mitigation device 220 detects that data from the medical device deviates from expected data (e.g., more than a threshold degree or number of standard deviations). In embodiments, the working capacity determination and mitigation device 220 detects a medical event (e.g., excess fatigue, a diabetic episode, etc.) from the medical device data, and determines that the medical event indicates that the individual is unavailable. In turn, the process 500 returns to step 512 (via node B) to generate and execute a mitigation instruction, thereby automatically initiating mitigating actions to accommodate the individual's absence.

In embodiments, extension instructions are generated and executed. For example, the process 500 includes determining whether the patient is discharged within the predicted duration (step 522). For example, the working capacity determination and mitigation device 220 determines whether the patient is discharged from a medical facility within the predicted duration determined at step 518. In embodiments, the working capacity determination and mitigation device 220 determines whether the patient (e.g., individual) is discharged from a medical facility within the predicted duration based on communicating with a patient tracking system of the medical facility/medical provider. If, for example, the patient is not discharged within the predicted duration (step 522—NO), the process 500 proceeds to step 514 (via node C) in which extension instructions are generated and executed as described herein.

If, on the other hand, the patient is discharged within the predicted duration (step 522—YES), the process 500 includes determining whether medication was provided (step 524). For example, the working capacity determination and mitigation device 220 determines whether medication was provided based on monitoring and/or receiving push notifications from a pharmacy and/or medical insurance provider indicating that a pharmacy claim has been made. If medication has not been provided (step 524—NO), no further action is taken and the process 500 concludes. If for example, medication is provided, the process 500 returns to step 502 (via node A) in which the working capacity determination and mitigation device 220 determines whether the medication affects the individual's job roles and generates and executes corresponding mitigation instructions. In addition, in embodiments, the process 500 includes step 524 regardless of whether the patient is discharged within the predicted duration (e.g., at step 522).

As described herein, aspects of the present invention infer medical information (e.g., shown in the data object 502.1 in FIG. 5A) using machine learning techniques. For example, referring to FIG. 5D, the process 500 includes applying machine learning to determine a condition (step 526). For example, based on receiving the prescription information (e.g., at step 502), the working capacity determination and mitigation device 220 applies machine learning to determine a condition based on the type of medication prescribed and/or dosage instructions. In embodiments, the working capacity determination and mitigation device 220 access medical data from medical sources to aid in determining the condition.

The process 500 also includes applying machine learning to determine side effects (step 528). For example, the working capacity determination and mitigation device 220 determines the side effects of the medication based on the type of medication prescribed and/or dosage instructions. As an example, a dosage instruction to refrain from driving with the medication indicates that a side effect is drowsiness.

The process 500 further includes applying machine learning to classify the individual's job role (step 530). For example, the working capacity determination and mitigation device 220 classifies the individual's job role by analyzing the individual's messages, social media profile, biographical information, etc.

From the process steps 526, 528, and/or 530, the data object 502.1 is generated and/or augmented. The process 500 returns to step 504 (via node E) in which the completed data object 502.1 is used to determine if the individual's work capacity is affected, and to generate and execute corresponding mitigation instructions.

In embodiments, a service provider could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In one example, a computer-implemented method includes: receiving prescription information for a patient, the prescription information including a medication and a condition; identifying, from a condition lookup table, job roles impacted by the condition; identifying, from a side effect lookup table, job roles impacted by side effects of the medication; determining that the patient's work will be impacted by the condition or the medication; and in response to the determining, performing business continuity actions based on the patient's impacted work (e.g., setting out of office notification, setting instant messaging status as away, reschedule meetings, notify managers/coworkers, reassigning patient's work).

In aspects, the method also includes identifying a start date for medication administration in the prescription information, wherein the performing business continuity actions is further in response to determining that the start date has been reached. Moreover, in implementations, the business continuity actions are extended for a duration based on when the medication is administered. In embodiments, the method also includes performing natural language processing on the prescription information to identify known conditions and side effects. Implementations also include: applying text analytics to instructions in the prescription information to identify unavailable times for the patient; and performing calendar actions (e.g., reschedule meetings and block off time on calendar), based on the identified unavailable times.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    tracking, by a computing device, an effect of different medical conditions and side effects of medications on work capacity of different job roles over time using machine learning;
    generating, by the computing device, a look-up table identifying job roles impacted by the different medical conditions and side effects of medications based on the tracking, wherein the effect of the different medical conditions and the side effects of medications on work capacity are represented as numeric values in the look-up table indicating an individuals' level of diminished working capacity on a scale from slightly diminished to a point where the individual is entirely absent, and the numeric values are determined via the machine learning over time;

updating, by the computing device, the look-up table over time using the machine learning based on continued tracking of the effect of different medical conditions and side effects of medical conditions on work capacity of different job roles over time;

receiving, by the computing device, prescription information for an individual;

applying, by the computing device, additional machine learning to infer a medical condition of the individual based on the prescription information;

identifying, by the computing device, a first set of job roles impacted by the medical condition of the individual based on the look-up table;

identifying, by the computing device, a second set of job roles impacted by side effects of the medication of the individual based on the look-up table;

determining, by the computing device, that a working capacity of the individual is diminished by the medical condition of the individual or the side effects of the medication of the individual based on a comparison of the first set of job roles and second set of job roles with one or more job roles of the individual;

determining, by the computing device, an extent to which the working capacity of the individual is diminished based on the numeric values in the look-up table, thereby determining an extent of diminished work capacity of the individual;

determining, by the computing device, a predicted time period for the diminished work capacity of the individual based on the extent of the diminished work capacity and the look-up table;

generating, by the computing device, mitigation instructions in response to the determining the working capacity of the individual is diminished and the predicted time period for the diminished work capacity; and automatically executing, by the computing device, the mitigation instructions, including automatically changing out of office settings in an email system of the individual based on the predicted time period for the diminished work capacity.

2. The computer-implemented method of claim 1, wherein the automatically executing the mitigation instructions includes at least one selected from the group consisting of:

executing an instruction to automatically set an away message in the email system of the individual;

executing an instruction to initiate a resource management process;

executing an instruction to automatically reschedule meetings in a calendar application; and executing an instruction to send a notification regarding the diminished working capacity of the individual.

3. The computer-implemented method of claim 1, wherein the mitigating instruction identify a time when the working capacity of the individual is expected to be restored.

4. The computer-implemented method of claim 3, further comprising generating and executing, by the computing device, a mitigation extension instruction based on determining that the working capacity of the individual is expected to remain diminished for a period longer than the predicted time period.

5. The computer-implemented method of claim 1, further comprising identifying, by the computing device, a start date for medication administration in the prescription information, wherein the executing the mitigating instruction is further in response to determining that the start date has been reached.

6. The computer-implemented method of claim 1, further comprising applying, by the computing device, text analytics to dosage instructions in the prescription information to identify times in which the working capacity of the individual is expected to be diminished, wherein the executing the mitigation instructions is based on the identified times.

7. The computer-implemented method of claim 1, wherein a service provider performs at least one selected from the group consisting of: creates the computing device, maintains the computing device, deploys the computing device, and supports the computing device.

8. The computer-implemented method of claim 1, wherein the receiving the prescription information, the identifying the first set of job roles impacted by the medical condition, the identifying the second set of job roles impacted by the side effects, the determining the extent to which the working capacity of the individual is diminished, the generating the mitigation instructions, and the executing the mitigation instructions are provided by a service provider on a subscription, advertising, and/or fee basis.

9. The computer-implemented method of claim 1, wherein the computing device includes software provided as a service in a cloud environment.

10. The computer-implemented method of claim 1, further comprising deploying a system, wherein the deploying the system comprises providing a computer infrastructure operable to perform the receiving the prescription information, the identifying the first set of job roles impacted by the medical condition, the identifying the second set of job roles impacted by the side effects, the determining the extent to which working capacity of the individual is diminished, the generating the mitigation instructions, and the executing the mitigation instructions.

11. The computer-implemented method of claim 1, wherein the automatically executing the mitigation instructions comprises executing an instruction to set an away message in a calendar application.

12. The computer-implemented method of claim 1, wherein the automatically executing the mitigation instructions comprises executing an instruction to automatically reschedule meetings in a calendar application.

13. The computer-implemented method of claim 12, wherein the mitigation instructions are further based on a determined predicted duration for how long the mitigation instructions should last, wherein the rescheduling meetings comprising rescheduling meetings until after the predicted duration.

14. The computer-implemented method of claim 13, further comprising generating, by the computing device, a mitigation extension instruction that extends the predicted duration.

15. The computer-implemented method of claim 1, wherein the automatically executing the mitigation instructions comprises reassigning the individual's work.

16. The computer-implemented method of claim 1, further comprising:

determining, by the computing device, whether the individual has been discharged from a medical facility within a determined predicted duration for how long the mitigation instructions should last based on a communication with a system of the medical facility; and generating, by the computing device, mitigation extension instructions that extend the predicted duration in response to determining that the individual has not been discharged from the medical facility.

17. The computer-implemented method of claim 1, further comprising classifying, by the computing device using machine learning, the one or more job roles of the individual based on an analysis of a social media profile of the individual.

18. The computer-implemented method of claim 1, further comprising classifying, by the computing device using machine learning, the one or more job roles of the individual based on an analysis of messages of the individual.

19. The computer-implemented method of claim 1, further comprising classifying, by the computing device using machine learning, the one or more job roles of the individual based on an analysis of biographical information of the individual.

20. The computer-implemented method of claim 1, further comprising:
    receiving, by the computing device, medical device data from a medical device of the individual;
    detecting, by the computing device, a medical event of the individual based on the medical device data; and
    determining, by the computing device that the individual is unavailable based on the medical event, wherein the determining the extent to which the working capacity of the individual is diminished is further based on the determining that the individual is unavailable.

\* \* \* \* \*